(12) United States Patent
Kapoor et al.

(10) Patent No.: US 9,922,104 B1
(45) Date of Patent: Mar. 20, 2018

(54) METADATA DRIVEN CODE-GENERATED EXTERNAL DATA FEEDS

(71) Applicant: Numerify, Inc., Cupertino, CA (US)

(72) Inventors: Rahul Kapoor, Cupertino, CA (US);
Gaurav Rewari, Cupertino, CA (US);
Sadanand Sahasrabudhe, Rockville, MD (US)

(73) Assignee: Numerify, Inc., San Jose, CA (US)

( * ) Notice: Subject to any disclaimer, the term of this patent is extended or adjusted under 35 U.S.C. 154(b) by 697 days.

(21) Appl. No.: 14/536,551

(22) Filed: Nov. 7, 2014

Related U.S. Application Data

(60) Provisional application No. 62/037,087, filed on Aug. 13, 2014.

(51) Int. Cl.
*G06F 17/30* (2006.01)
*G06F 7/00* (2006.01)

(52) U.S. Cl.
CPC .. *G06F 17/30563* (2013.01); *G06F 17/30592* (2013.01)

(58) Field of Classification Search
CPC ......... G06F 17/30592; G06F 17/30563; G06F 17/30569; G06F 17/30595
USPC ....................................................... 707/602
See application file for complete search history.

(56) References Cited

U.S. PATENT DOCUMENTS

| | | | | |
|---|---|---|---|---|
| 9,158,827 B1* | 10/2015 | Vu | ..................... | G06F 17/30563 |
| 2007/0036077 A1* | 2/2007 | Boggs | .................. | H04O 3/0066 370/230 |
| 2011/0055147 A1* | 3/2011 | Joerg | .................... | G06F 9/4843 707/602 |
| 2011/0208755 A1* | 8/2011 | Fiske | .................. | G06F 11/1448 707/751 |
| 2013/0311494 A1* | 11/2013 | Henderson | ........ | G06F 17/30893 707/756 |

* cited by examiner

*Primary Examiner* — Usmaan Saeed
*Assistant Examiner* — Raquel Perez-Arroyo
(74) *Attorney, Agent, or Firm* — Rahman LLC

(57) ABSTRACT

Approaches for providing a customizable external data feed to a recipient. Metadata that identifies a plurality of configuration parameters that define characteristics of the external data feed are stored. A plurality of executable jobs using the configuration parameters defined in the metadata are programmatically generated. At least a first portion of executable jobs are executed to extract a data set identified by the configuration parameters from a persistent data store. At least a second portion of executable jobs are executed to format and transform the data set according to the configuration parameters. The external data feed, which comprises the formatted and transformed data set, is provided to the recipient.

15 Claims, 8 Drawing Sheets

FIG. 3A

Image 1

| RowId | A | B | C |
|---|---|---|---|
| 1 | 1 | 1 | 1 |
| 2 | 9 | 9 | 9 |

FIG. 3B

Forward delta data set 1

| RowId | A | B | C | Change |
|---|---|---|---|---|
| 1 | 1 | 2 | 3 | M |
| 2 | ~~9~~ | ~~9~~ | ~~9~~ | D |
| 3 | 2 | 2 | 2 | A |

FIG. 3C

Image 2

| RowId | A | B | C |
|---|---|---|---|
| 1 | 1 | 2 | 3 |
| 3 | 2 | 2 | 2 |

FIG. 3D

Backward delta data set 1

| RowId | A | B | C | Change |
|---|---|---|---|---|
| 1 | 1 | 1 | 1 | M |
| 2 | 9 | 9 | 9 | A |
| 3 | ~~2~~ | ~~2~~ | ~~2~~ | D |

FIG. 3E

Forward delta data set 2

| RowId | A | B | C | Change |
|---|---|---|---|---|
| 3 | 2 | 3 | 4 | M |
| 4 | 3 | 3 | 3 | A |

FIG. 3F

Image 3

| RowId | A | B | C |
|---|---|---|---|
| 1 | 1 | 2 | 3 |
| 3 | 2 | 3 | 4 |
| 4 | 3 | 3 | 3 |

FIG. 3G

Backward delta data set 2

| RowId | A | B | C | Change |
|---|---|---|---|---|
| 3 | 2 | 2 | 2 | M |
| 4 | ~~3~~ | ~~3~~ | ~~3~~ | D |

Combined backward delta data set

| RowId | A | B | C | Change |
|---|---|---|---|---|
| 1 | 1 | 1 | 1 | M |
| 2 | 9 | 9 | 9 | A |
| 3 |   |   |   | D |
| 4 |   |   |   | D |

FIG. 4A

Combined forward delta data set

| RowId | A | B | C | Change |
|---|---|---|---|---|
| 1 | 1 | 2 | 3 | M |
| 2 | 9̶ | 9̶ | 9̶ | D |
| 3 | 2 | 3 | 4 | A |
| 4 | 3 | 3 | 3 | A |

FIG. 4B

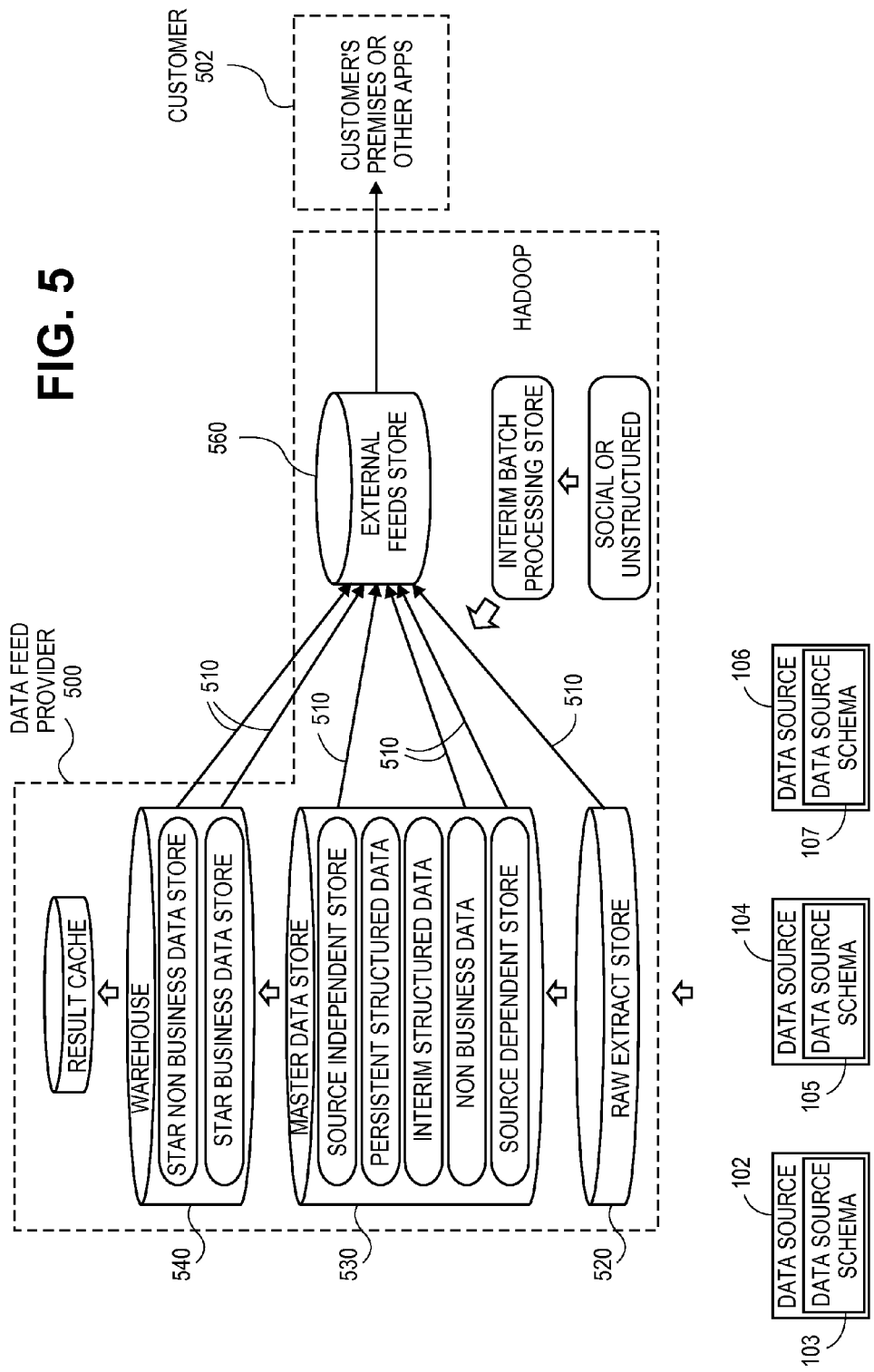

METADATA DRIVEN CODE-GENERATED EXTERNAL DATA FEEDS

CLAIM OF PRIORITY

This application claims priority to U.S. provisional patent application No. 62/037,087, filed Aug. 13, 2014, entitled "External Feeds and Model Driven, Tool Agnostic Multi Step Code Generation Approach for BI Processes Facilitating Cross Cloud BI," the contents of which are hereby incorporated by reference for all purposes as if fully set forth herein.

FIELD OF THE INVENTION

Embodiments of the invention relate to the generation of value-added external data feeds.

BACKGROUND

Different computerized systems use data in different ways. The way in which data is used informs how the data is stored and maintained. To illustrate this widely recognized principle, the domains of data warehousing and data feeds will be briefly discussed.

A data warehouse is a database used for generating reports and data analysis. To facilitate reporting and data analysis functions, data is often transformed and organized in star schemas within a data warehouse. Populating the data within the data warehouse is done via ETL (Extract, Transform, Load) operations, which requires that the ETL system maintain, in addition to the current state of the data warehouse, information about the last incremental data extractions obtained from the source tables. ETL operations propagate incremental changes made at the source tables into the star schemas of the data warehouse. ETL operations may transform the data prior to loading the data into the data warehouse. Examples of such types of transformation include data cleansing, data standardization, surrogate key generation, surrogate key replacement, unit of measure conversion, and currency conversion. Business intelligence (BI) applications use data gathered from a data warehouse or a subset of the warehouse called a data mart.

A data feed is a stream of data which may allow the recipient to receive updated data from one or more data sources as the data changes at the data source. A data feed can supply data in the same format as the data source or in a different format (such as a star schema) which provides additional benefit to the recipient compared to how the data is expressed natively at the source.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 3A is an illustration of a first state of data stored in the data repository in a discussion of generating a backward delta data set according to an embodiment of the invention;

FIG. 3B is an illustration of a first forward delta data set in a discussion of generating a backward delta data set according to an embodiment of the invention;

FIG. 3C is an illustration of a second state of data stored in the data repository in a discussion of generating a backward delta data set according to an embodiment of the invention;

FIG. 3D is an illustration of a first backward delta data set in a discussion of generating a backward delta data set according to an embodiment of the invention;

FIG. 3E is an illustration of a second forward delta data set in a discussion of generating a backward delta data set according to an embodiment of the invention;

FIG. 3F is an illustration of a third state of data stored in the data repository in a discussion of generating a backward delta data set according to an embodiment of the invention;

FIG. 3G is an illustration of a second backward delta data set in a discussion of generating a backward delta data set according to an embodiment of the invention;

FIG. 4A an illustration of the result of combining the backward delta data sets depicted in FIGS. 3D and 3G according to an embodiment of the invention;

FIG. 4B an illustration of the result of combining the forward delta data sets depicted in FIGS. 3B and 3E according to an embodiment of the invention;

FIG. 5 is an illustration of the levels of external data feeds which may be provided to a customer according to an embodiment of the invention;

DETAILED DESCRIPTION OF THE INVENTION

Figure 1:
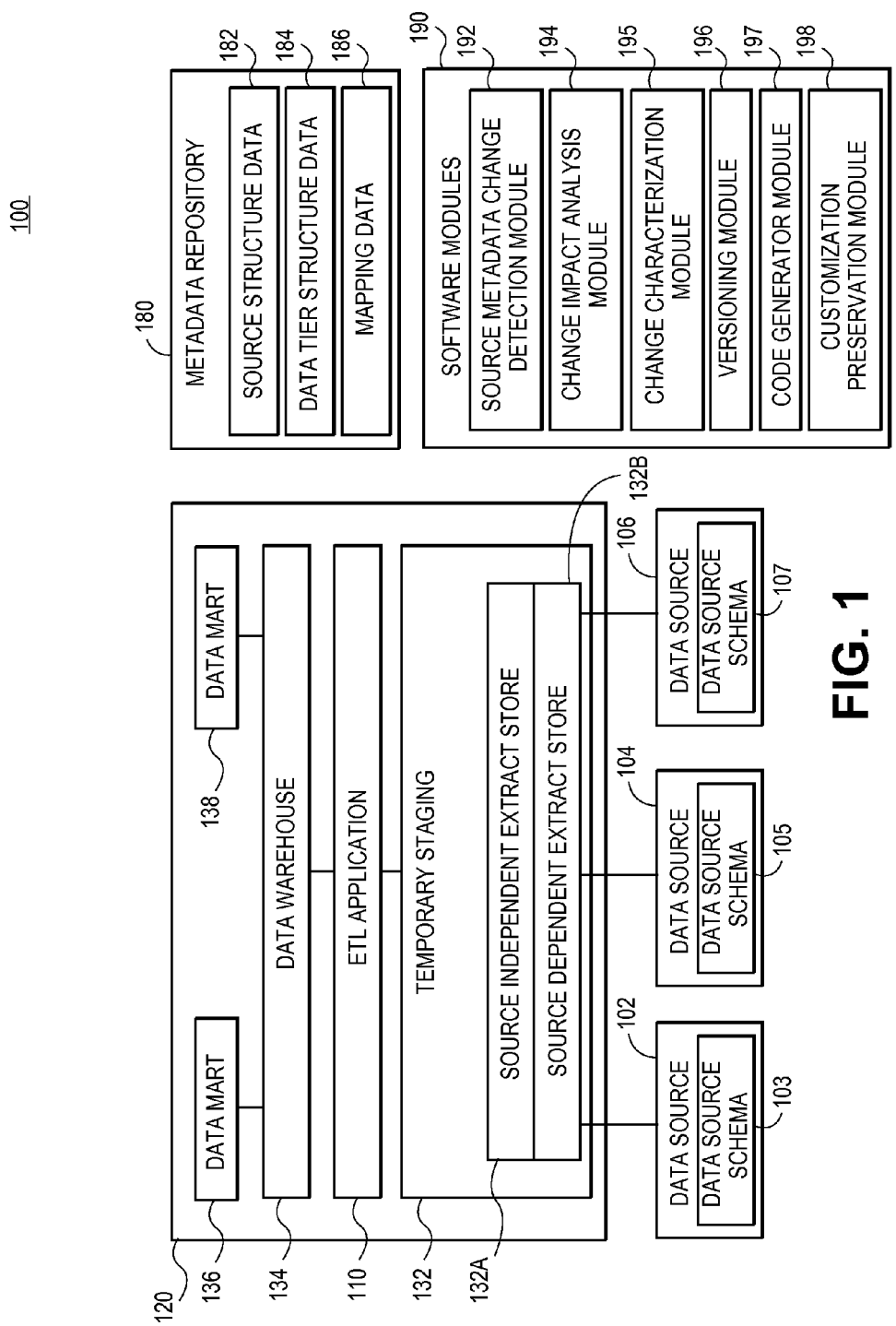
FIG. 1 is a block diagram of the components of a first exemplary data management system according to one embodiment of the invention.

Approaches for generating and providing value-added external data feeds use a metadata driven, code generated process are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Organizations and businesses are often comprised of various operational units having different data storage and reporting requirements. For example, the financial department of a company may need financial reports generated from data stored in one database, while the marketing department may need access to information stored in an entirely separate database. Each database may store data in a different schema or format, and so a single company may use many databases and/or applications, each of which expects data to be stored or organized in a different manner.

Rather than maintaining, at considerable expense and complexity, the hardware and software resources to operate their own data management application, a company may instead choose to make use of a cloud-based data management application. A cloud-based data management application is a data management application that is operated by a different party (termed "the cloud application provider" or "the operator of a cloud-based application") than the company using the cloud-based application. The company using the cloud-based application may access the cloud-based application over the Internet (colloquially named the "cloud," hence the origin of the term cloud-based application).

The use of cloud-based applications by a company presents certain challenges to the data management ecosystem for that company. The operator of a cloud-based application generally hosts the cloud-based application for a plurality of different companies; as such, making a change in the cloud-based application from a default configuration of the cloud-based application to accommodate a configuration change desired by one party is difficult, as the same cloud-based application is intended to be used by a variety of other parties who may not wish the configuration change to be made to their view of the cloud-based application.

The use of a cloud-based application by a company may also complicate the use of other non-cloud-based data management applications, used by that company, which expect to access data locally rather than over the Internet. Indeed, certain data management applications operated by a company may be unable to communicate with a cloud-based data management application operated by other parties. As a result, those data management applications lacking access to the data maintained and managed by a cloud-based data management application may not have access to all the data necessary to fulfil their intended role or function.

Embodiments of the invention provide for a data management ecosystem that overcomes the limitations of the prior art. Approaches are discussed herein for cloud-based data management applications which may be used by a plurality of different companies. A cloud-based data management application of an embodiment may operate, for each company using the cloud-based data management application, upon data sourced from a variety of different types of data sources, such as but not limited to data management applications, locally operated by each company using the cloud-based data management application, from vendors such as, but not limited to, SalesForce, ServiceNow, and NetSuite. After embodiments of the invention have extracted data from one or more data sources of a company, the cloud-based data management application of an embodiment may transform the company's data in a variety of different ways as shall be described in detail below. Thereafter, the processed and transformed data of a company may be provided back to that company via one or more external data feeds. In this way, the company may receive value-added versions of their data in the form of an external data feed even if the company lacks the capability to perform such processing themselves.

As shall be discussed in detail below, external data feeds may be used for a variety of different purposes. An external data feed of an embodiment may be used to generate data backups for a company which desires to store a copy of their data on site by the company rather than storing the data "on-the-cloud," i.e. storing the data at a location accessible over the Internet. Embodiments may be configured to provide an external data feed to any specified destination; however, it is anticipated that most companies may wish to physical store a digital copy of their data at the own property or premises.

Also, if any component of a company's data management ecosystem expects to operate upon a locally stored copy of data, then embodiments of the invention can make such components wholly operable by providing the components with a local copy of the relevant company data which would otherwise be stored in the cloud. If the component of the company's data management ecosystem previously lacked access to the data, then embodiments can augment such components with processed, value-added data using an external data feed.

Moreover, embodiments of the invention enable new and advantageous computing data management ecosystems. For example, a cloud-based application vendor may not maintain a data warehouse and therefore cannot provide historical analytics to its customers. Using embodiments of the invention, data from the cloud-based application vendor may be extracted, processed, and stored in a data warehouse in a cloud-based data warehouse by another entity. Embodiments may provide processed, value-added data from this data warehouse to the operator of the cloud-based application vis-à-vis an external data feed, thereby enabling the cloud-based application to perform analytics and reporting functionality based on the historical data provided in the external data feed.

Prior to discussing in more detail how external data feeds of the invention may be generated and used, it will be helpful to appreciate the architecture of certain illustrative embodiments, as discussed in the next section.

Architecture Overview

Embodiments of the invention discussed herein support a wide variety of customer customizations to non-cloud-based data management applications and to cloud-based data management applications in an efficient and automated manner. As described in more detail below, a data management system of an embodiment may allow a company to use prepackaged data management applications in different business domains, such as like Financial Analytics, IT Service Management, Sales, and Marketing analytics. These data management applications may manage and process data obtained from one or more business source systems. In doing so, the data may be transformed to a form more amenable for the performance of analytics by the data management applications.

While data management systems of an embodiment enable the use of prepackaged data management applications, it is anticipated that facets of these data management applications will require customization to support the individual and unique needs of the company or organization using the business management applications. For example, it is anticipated that data management systems of an embodiment will need to support customization made to (a) the data schemas used by the data management applications and/or data sources, (b) reports generated by the data management applications, and (c) ETL processes involving the data management applications. The prior art currently supports such customizations by creating a release update per customer (where a customer is a particular company or organization) based on the customer's last customized image of the data management application suite, manually analyzing and comparing customer customizations to the changes in the release update, manually identifying what customer customizations can be preserved and what cannot, and manually handling those customizations which can be preserved; however, this approach cannot scale for a service provider with a large number of customers that each have a large number of disparate customizations.

Overcoming obstacles unsurmounted by the prior art, embodiments of the invention support a wide variety of customizations by employing an automated code-driven approach based upon stored metadata. In an embodiment, metadata that describes both the structure of data schemas employed by data sources (termed "data source schemas") and the data schemas employed data management applications (termed "data tier schemas") is stored. In addition, metadata that describes a mapping between the data source schemas and data tier schemas is stored. Metadata that describes how ETL processes and reporting functionality should be performed based on the structure of the data source schemas and the data tier schemas is also stored and maintained. In embodiments, software modules perform automated functions to support customizations for all customers of the data management system. Such automated functions may be performed by generating executable code whose execution depends upon values read from the stored metadata.

To illustrate one example, if stored metadata indicates that a new metric has been added by a particular customer to a particular data management application, then one or more software processes are automatically initiated to determine whether a data tier schema needs to change to accommodate the new metric, and if so, the data tier schema for that customer only is automatically updated in that manner. Moreover, one or more software processes may analyze the stored metadata to determine whether any existing ETL processes for that customer need to be updated or if any new ETL processes need to be created for the customer to support this customization. As other examples, one or more software processes may be automatically initiated to review the metadata to determine if the mapping between the data source schemas and the data tier schemas need to be updated for that customer and if any data needs to be moved or populated within the data tier schemas in view of any change made to a data tier schema. These are but a few examples of some of the ways customizations may be supported, as many more approaches for doing so are discussed herein.

FIG. 1 is a block diagram of the components of a data management system 100 according to one embodiment of the invention. Data management system 100 may be used as a source of data to be provided in an external data feed according to an embodiment of the invention. System 100 includes data sources 102, 104, and 106, data tier 120, metadata repository 180, and software modules 190.

Data sources 102, 104, and 106 are broadly meant to depict any source from which data may be obtained. Data sources 102, 104, and 106 may be maintained and operated by a different party or company than the operator of data tier 120. In practice, one or more of data sources 102, 104, and 106 may correspond to business application sources like SalesForce, NetSuite, ServiceNow, Marketo, or Eloqua; data may be extracted from such business application sources using the API's provided thereby. One or more of data sources 102, 104, and 106 may also correspond to public or government databases; for example, such databases may store information about weather, currency exchange rates, public government records, and the like. One or more of data sources 102, 104, and 106 may also correspond to publically available sources of market data. While only three data sources are depicted in FIG. 1; embodiments of the invention may be used with any number of data sources. Data source 102, 104, 106 each may persist data using data source schema 103, 105, 107 respectively. Note that each company or organization storing data in or retrieving data from a data source (such as data source 102, 104, and 106) may wish, at any time and at multiple occasions, to customize the data source schema employed by the data source.

The data tier, as broadly used herein, refers to any computerized approach for storing data which may be accessed by a data management application. A particular example of a data tier is depicted in FIG. 1 as data tier 120. As shown in FIG. 1, data tier 120 may comprise a temporary staging area 132, an ETL application 110, a data warehouse 134, and one or more data marts 136, 138.

Temporary staging area 132 broadly refers to any mechanism for temporary storing data retrieved from data sources 102, 104, and 106 to facilitate its use by a data management application. Once data is populated in temporary staging area 132, the data may be formatted or processed prior to loading the data into data warehouse 134. For example, in data tier 120 depicted in FIG. 1, temporary staging area 132 comprises a Source Independent Extract Store 132A and a Source Dependent Extract Store 132B. In this example, data that is retrieved from a data source may be stored directly into Source Dependent Extract Store 132B. Thereafter, the data may be modified to transform the data into a source independent format and moved to Source Independent Extract Store 132A. As implied by the name, once data has been moved from temporary staging area 132 to data warehouse 134, the data may be removed from temporary staging area 132

ETL application 110, as broadly used herein, refers to one or more applications for extracting data from temporary staging 132, potentially performing one or more data transformations on the extracted data, and loading the transformed data into data warehouse 134. ETL application 110 may retrieve an initial extract of data from temporary staging 132 and thereafter retrieve incremental extracts corresponding to the changes made at a data source since the data was last retrieved therefrom. Prior to loading the extracted data into data warehouse 134, ETL application 110 may perform a variety of data transformations on the extracted data, such as but not limited to archival processes, CDC (change data capture) processes, source dependent to source independent processes, delta propagation processes, surrogate key generation processes, and surrogate key replacement processes. Processes for performing data transformations are well understood to those skilled in the art and will not be expounded upon further herein.

Data warehouse 134, as used herein, refers to a database for reporting and data analysis. Data stored by data warehouse 134 may be originally obtained from a plurality of sources, namely data sources 102, 104, 106. Data warehouse 134 may store current and historical data and may be accessed by one or more of data management applications.

Data marts 136, 138, as used herein, each correspond to a database that stores a subset of the data stored in data warehouse 134. The data stored within data marts 136, 138 typically serves a particular focus; for example, a particular dart mart might serve a specific business line or team. While only two data marts, namely dart marts 136, 138, are depicted in FIG. 1 for clarity, embodiments of the invention may employ any number of data marts, including no data marts, one data marts, or three or more data marts.

Metadata repository 180, as broadly used herein, refers to any mechanism for storing metadata. The metadata stored in metadata repository 180 describes the customizations performed by a customer throughout system 100. This metadata may be used to describe how data is stored at a data source or at data tier 120 as well as provide insight into how data originating at a data source is used by all aspects of system 100. Further, this metadata may be used to customize the operation of software modules 190. As another example, this metadata may be used to customize the generation and delivery of an external data feed, which shall be described in further detail below.

Different types of metadata may be stored in metadata repository 180. To illustrate, metadata repository, in an embodiment, may store source structure metadata 182, data tier structure metadata 184, and mapping data 186. Source structure metadata 182 describes the structure, characteristics, and configurations of a data source (including the data source schemas), data tier structure metadata 184 describes the structure, characteristics, and configuration of aspects of the data tier (including data tier schemas), and mapping data 186 describes a mapping or relationship between attributes of data source schemas to attributes of data tier schemas. In this way, the metadata stored by metadata repository 180 may be used to view how data flows through system 100 and how a change to an aspect of one type of data affects other portions of system 100. The use of metadata stored by metadata repository 180 shall be described in more detail in the next section.

Software modules 190 refers to a set of software processes or modules which are responsible for performing automated functions based on the metadata stored in metadata repository 180, e.g., software modules 190 support customizations made by a particular company or organization to components of system 100. Software modules 190 may be composed in a dynamic fashion based on the metadata stored in metadata repository 180.

Source metadata change detection module 192, as broadly used herein, refers to one or more processes for detecting a customization made to a data source, such as a change made by a customer to a default version of a data source schema. Source metadata change detection module 192 may ascertain the structure of data source schemas using APIs exposed by the corresponding data source. Source metadata change detection module 192 may periodically execute and use the API of a particular data source to ascertain information about the structure of a data source schema. By comparing information learned in this manner across different points in time, source metadata change detection module 192 can ascertain if a customer has made a customization to data source 102, 104, or 106. Upon determining that a customization to a data source has been made, source metadata change detection module 192 may notify change impact analysis module 194 so that change impact analysis module 194 can assess the impact of the detected customization upon other parts of system 100.

Change impact analysis module 194, as broadly used herein, refers to one or more processes for assessing the impact and implications of customizations performed or requested by a customer upon other portions of system 100. Metadata stored in metadata repository 180 indicates the lineage of how data moves through system 100; for example, mapping data 186 contains information that describes what attributes of data source schemas are mapped to attributes of data tier schemas. In response to being notified that an aspect of a data source schema has changed, change impact analysis module 194 may read mapping data 186 to determine what other portions of system 100 are affected by a changed attribute or entity, as mapping data 186 contains information describing how that changed attribute or entity may affect other schemas, reports, or ETL processes. To illustrate a simple example, if a customer performs a customization on a data source schema to change the data type of a particular attribute 186 Integer to String, then change impact analysis module 194 may review mapping data 186 to identify any report, data tier schema, or ETL process which will need to be updated to accommodate that customization. After change impact analysis module 194 determines the impact on system 100 caused by a particular customization at a data source, change impact analysis module 194 notifies change characterization module 195.

Change characterization module 195, as broadly used herein, refers one or more processes for characterizing a particular change made to a data source. After characterizing a particular change made to a data source, change characterization module 195 may perform a responsive action to accommodate the change, such as (a) ignore the change made to the data source, (b) automatically update data tier structure data 184 and/or mapping data 186 stored in metadata repository 180, without human input or instruction, to allow the change made to the data source to be accommodated by system 100, or (c) request user input on what actions should be performed in response to the change made to the data source. Change characterization module 195 may solicit and receive user input, if need be, via a user interface according to a variety of different implementation designs. If change characterization module 195 updates data tier structure data 184 and/or mapping data 186 stored in metadata repository, change characterization module 195 may notify code generator module 197 so that code generator module 197 may implement the changes specified by the updated metadata.

Code generator module 197, as broadly used herein, refers to one or more processes for implementing changes specified by metadata stored in metadata repository 180. Code generator module 197 may read values stored in metadata repository and thereafter use the read values as input to executable code (referred to herein as "jobs"), which when executed, causes changes to the structure or operation of data tier 120 to reflect the metadata stored in metadata repository 180. For example, code generator module 197 may make a change to a data tier schema and potentially as a result, move and/or transform data from one data type to another data type based on the schema change. In addition to making changes to data tier schemas and moving/transforming data, code generator module 197 may also update, add, or delete executable jobs responsible for ETL processes, reports, dashboards, and any other functional aspect of how data may be used in system 100.

Versioning module 196, as broadly used herein, refers to the one or more processes responsible for updating metadata stored in metadata repository in response to a change detected in either a data source or in the data tier. Versioning module 196 may record information describing the circumstances of what was changed each time metadata is updated to reflect that change. In this way, changes in system 100 are always made in a versioning manner so that discrete changes made to system 100 may be analyzed at a future date in a meaningful manner.

Customization preservation module 198, as broadly used herein, refers to one or more processes for determining which customer specific customizations can be supported in a new customer-wide version of schemas employed by the data tier released by the operator of system 100. In an embodiment, each new customer-wide version of schemas employed by the data tier released by the operator of system 100 will correspond to a particular version of data tier structure data 184. For example, if the operator of data tier 120 wishes to deploy an updated version of data tier structure data 184, then customization preservation module 198 may be used to determine how customer specific customizations can be supported in a new version of metadata. The operation of customization preservation module 198 is described below in detail with reference to step 230 of FIG. 2.

Having provided a description of the components of system 100 which may supply data to be included within an external data feed, additional details of how system 100 may store versioned and history data to be included in an external data feed according to an embodiment of the invention shall be presented below.

Maintaining a Backward Delta Data Set

Figure 2:
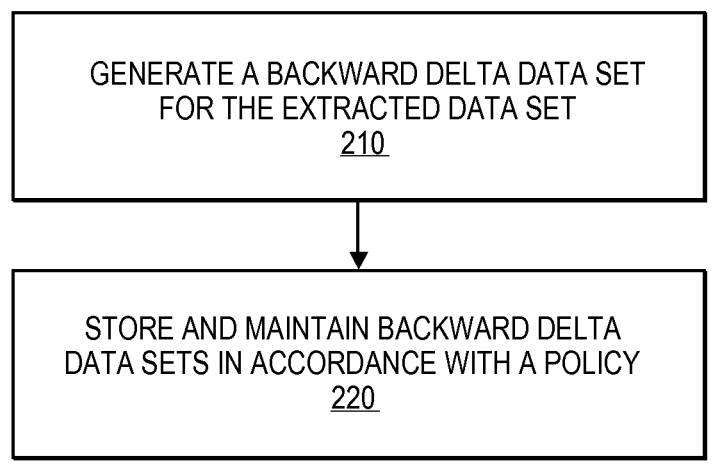
FIG. 2 is a flowchart illustrating the steps of maintaining a common extract store according to an embodiment of the invention.

FIG. 2 is a flowchart illustrating the steps of maintaining a backward delta data set according to an embodiment of the invention. Initially, in step 210, a data server analyzes the data stored in a data repository of data tier 120 for purposes of generating a backward delta data set. A backward delta data set is a mechanism of an embodiment which enables the data repository to store data that changes over time compactly while still supporting queries against data snapshot at any point in time. In an embodiment, a backward delta data set identifies what additions, deletions, and modifications need to be made to data stored in data repository to cause a current version of the data repository to return to a most recent version of the data repository. Advantageously, in certain embodiments, all historical data reflecting any prior versions of data stored in the data repository is recorded in one or more backward delta data sets.

The generation of a backward delta data set will be described below with reference to FIGS. 3A-3G. For purposes of providing a clear explanation, assume that the current state of the data stored in the data repository is shown in FIG. 3A. Thereafter, assume a CDC application retrieves an incremental data set from data source 102 and provides this incremental data set to a data server. This incremental data set, depicted in FIG. 3B, may be referred to herein as a forward delta data set, due to its forward looking description of the change (or "delta") made to a data set. Note that the CDC application annotates the extracted data records with an identifier indicating whether the particular record is added, deleted, or modified. For example, as shown in FIG. 3B, the values in the Change column identify whether the values in the row have been modified (corresponding to an "M"), whether the values in the row have been deleted (corresponding to a "D"), or whether the values in the row have been added (corresponding to an "A").

Thereafter, the server applies the forward delta data set shown in FIG. 3B to the data stored in data repository shown in FIG. 3A. As a result, the data stored in the data repository will now correspond to that depicted in FIG. 3C. As shown in FIG. 3C, RowId 2 has been deleted, RowId 3 has been added, and RowId 1 has been modified with respect FIG. 3A.

The server thereafter creates a backward delta data set shown in FIG. 3D. The backward delta data set of FIG. 3D identifies what additions, deletions, and modifications need to be made to data stored in the data repository to cause the version of the data repository shown in FIG. 3C to return to the version of the data repository shown in FIG. 3A. In an embodiment, the server may create the backward delta data set shown in FIG. 3D by inverting the forward delta data set shown in FIG. 3B. The inversion process basically takes the "A" and "D" records of FIG. 3B and flips them to "D" and "A" respectively in the backward delta data set of FIG. 3D so the added records would need to be deleted from the new version of the data repository and deleted records added back to the result in the version of the data repository shown in FIG. 3A. The modified "M" records stay marked as modified but the actual modifications are reversed.

The server will create a new backward delta data each time data is changed in the data repository. To illustrate, FIG. 3E is an illustration a second forward delta data set retrieved from a data source and provided to the server by the CDC application. Based on receiving this incremental data set, the server will apply the changes indicated by the forward delta data set shown in FIG. 3E to the current version of data stored in the data repository (depicted in FIG. 3C) to arrive at the version of data depicted in FIG. 3F. After the data repository is updated to the state depicted in FIG. 3F, the server will generate another backward delta data set which identifies what additions, deletions, and modifications need to be made to data stored in the data repository to cause the version of the data repository shown in FIG. 3F to return to the version of the data repository shown in FIG. 3C. This backward delta data set is depicted in FIG. 3G.

After generating a backward delta data set, in step 220, the server stores and maintains the backward delta data set and the forward delta data set in accordance with a policy (hereafter the "maintenance policy"). The maintenance policy may be defined by policy data comprised within or accessible to the server. To manage storage costs over time, the maintenance policy may instruct two or more backward delta data sets, associated with a continuous interval of time (such as a day, a week, a month, a year, and so on) be combined into a single backward delta data set after the expiration of a specified amount of time. Similarly, the maintenance policy may also instruct two or more forward delta data sets to be combined in this fashion as well. In certain embodiments, the server may perform a periodic scheduled compaction process to compact backward delta data sets and/or forward delta data sets to reclaim storage while ensuring the minimal coverage required by the policy. The storing and maintaining of the backward delta data set may be performed by the server in accordance with the policy by one or more software processes and without human intervention.

To illustrate how backward delta data sets may be combined, consider FIG. 3A, which is an illustration of the result of combining the backward delta data sets depicted in FIGS. 3D and 3G. Applying the combined backward delta data set depicted in FIG. 4A to the data set depicted in FIG. 3F would result in the data set depicted in FIG. 3A, as the combined backward delta data set applies all the changes necessary to do so.

FIG. 4B is an illustration of the result of combining the forward delta data sets depicted in FIGS. 3B and 3E according to an embodiment of the invention. Applying the combined forward delta data set depicted in FIG. 4B to the data set depicted in FIG. 3A would result in the data set depicted in FIG. 3F, as the combined forward delta data set applies all the changes necessary to do so.

As illustrated above with reference to FIGS. 4A and 4B, to combine two or more backward delta data sets, a union is performed on the changes made across the backward delta data sets and maintaining for reference the oldest image of the data for rows that occur in multiple backward delta data sets. Similarly, a combined forward delta data set can be obtained from a corresponding combined backward delta data set by flipping the Added and Deleted records in the combined backward delta data set and looking at the final image to get the values of Added and Modified records.

By relying upon the maintenance policy to determine when to (a) combine forward or backward delta data sets or (b) deleting one or more forward or backward delta data sets, the maintenance policy may specify the granularity of restore points available, as restore points are only available to a particular level of granularity for which delta data sets are available. The policy may additionally specify the moving of delta sets getting deleted or compacted to cheaper storage so that they are not completely lost, just removed from the more expensive primary storage.

In certain embodiments, an external data feed is generated comprising historical data. Consequently, the policy followed may allow for more delta data sets to be maintained. Note that even in embodiments that do not perform data archiving or external data feed functions, or which does not require historical data to a fine level of granularity, the last few backward delta data sets are nevertheless stored so that they may be used for recovery purposes.

Embodiments may support both a source independent format (i.e., source independent extract store 132A) and a source dependent format (i.e., source dependent extract store 132B) without persisting the data in both formats. Rather than persisting the data in both formats, only the metadata definitions of the two schemas and the mapping from source specific to source independent are persisted. If the needs of a particular implementation do not require data to be stored within data tier 120 in conformance to schema format employed by a particular data source, then data extracted in the source specific format from a particular data source may be stored in a source independent format. On the other hand, if the needs of a particular implementation do require data to be stored in data tier 120 in the source specific format, then may store data in that source specific format and generate the source independent format on the fly based on the stored mappings between the two formats. If a particular implementation requires both formats and the extra storage cost is not a concern, then data tier 120 may persist the data in both formats. While these examples involve only two schemas, embodiments of the invention may support any number of schemas so long as the mappings between formats are persisted.

The mapping between schema formats in an automated fashion without human involvement, instruction, or intervention. To illustrate, upon a server receiving a query for data to be performed against a particular version of a schema of data tier 120, without human intervention the server may consult the metadata that identifies a mapping between the tabular format of data tier 120 and the particular version of a schema. Thereafter, the server may convert, using the metadata and without human intervention, the tabular format data repository into a converted data set in the particular version of the schema and may perform the query against the converted data set.

The use of backward delta data sets and the support for source specific and independent schemas that may change over time by data tier 120 serves the needs of the different data warehousing, operational reporting, data archiving, and data feed applications. To illustrate, a data warehouse application may make use of the current version of data in a data repository stored in the Source Independent format and the most recent forward delta data set to perform ETL processing. If a need arises to rollback the data warehouse to an earlier point in time, then backward delta data sets may be successively applied to obtain a data image at the desired point in time, and thereafter the ETL processing may be performed using the roll backed image. In fact, given that data repository 726 has a superset of data (schema wise) from the data warehouse and given the presence of historical delta data sets, the data warehouse may be created from scratch.

To generate an external data feed comprising historical data, the data of the external data feed may be assembled based on the feed query from the final image or from any prior point in time if specified in the query by applying the backward delta data sets. Additional details for generating an external data feed are presented below.

Illustrative Data Feed Architecture

Figure 6:
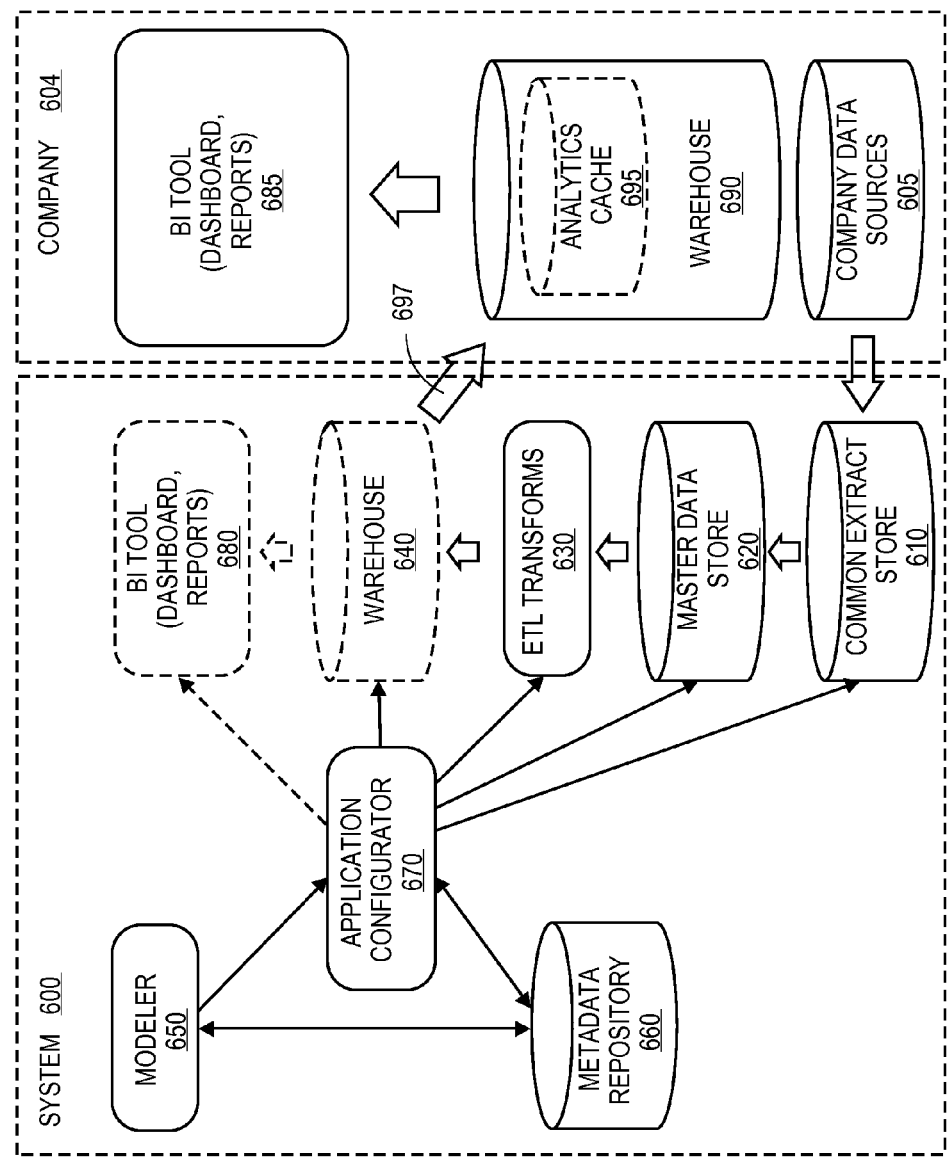
FIG. 6 is a block diagram of illustrative functional components of a system capable of generating an external data feed according to an embodiment of the invention.

FIG. 6 is a block diagram of the functional components of data management system 600 which is capable of providing an external data feed to a company according to an embodiment of the invention. The company receiving the external data feed may be any type of company, but it is contemplated that the receiving company may be a cloud-based application provider, and the external data feeds received by the company may enable the company to augment their cloud-based service or product offering. System 600 includes modeler 650, which is a software application that may be used to define one or more schemas for storing metadata (such as star schemas which comprise one or more fact tables which reference any number of dimension tables). Modeler 650 may also provide an interface to allow the one or more schemas defined by modeler 650 to be mapped to entities and attributes available from company data sources 605. Company data sources 605 correspond to a set of data sources (such as data sources 102, 104, and 106) used by company 604. While modeler 650 and application configurator 670 are shown in FIG. 6 as being separate entities, in embodiments of the invention the functions performed by modeler 650 and application configurator 670 may be performed by a single entity or application or by a plurality of different entities or applications.

After modeler 650 defines the schema(s) and the mapping between the schema(s) and company data sources 605, metadata defining the schema(s) and the mappings is stored in metadata repository 660. In addition to storing metadata defining schema(s) and mappings defined using modeler 650, metadata repository 660 also stores other types of information such as operational status and information obtained from company 604. Operational status refers to information about executable jobs generated based on stored metadata. Operational status information might identify when a particular job started, what state the job is in, and if and when the job completed.

System 600 further includes application configurator 670, which is an application that is designed to programmatically generate jobs that provision data repositories and move and transform data from company data sources 605, to common extract store 610, to master data store 620, performing any needed ETL transformations 630, to be stored in warehouse 640. These activities will be described in more detail below.

Initially, application configurator 670 generates a job, which once executed, causes data to be extracted from one or more company data sources 605 and stored in common extract store 610. Common extract store 610 is a data store designed to store data extracted from company data sources 605 in its native format.

Another job generated by application configurator 670, once executed, transforms the data stored in common extract store 610 into a relational format with support for historical storage and stores the transformed data in Master Data Store

620. Master Data Store 620 is a data store used to store data transformed into a relational format (amenable for ETL processing) as well as temporary and persistent data structures needed by ETL processing. The data stored in Master Data Store (MDS) 620 may then be stored in a Source Dependent format or a Source Independent format, the latter being derived from the format natively used by Master Data Store (MDS) 620. Within Master Data Store (MDS) 620, incremental extracts are annotated to indicate which data records have been added, deleted or modified from the previous data extract as part of Change Data Capture (CDC) processing. Note that while Master Data Store (MDS) 620 and common extract store 610 are depicted in FIG. 6 as being separate entities, in other embodiments Master Data Store (MDS) 620 and common extract store 610 may be implemented using a single digital data store.

Thereafter, application configurator 670 generates a job, which once executed, causes ETL transforms 630 to be performed on data stored in Master Data Store 620; the data processed by ETL transforms 630 is then stored in data warehouse 640 by the performance of an executed job generated by application configurator 670. ETL transforms 630 perform operations such as delta identification and propagation, surrogate key generation and replacement, currency conversion, UOM conversion, data standardization, deduping and data profiling. Data warehouse 640 may store the data processed by ETL transforms 630 in a star schema format, which is a format amenable to the performance of analytical processing. Data warehouse 640 may also store information about standardized units of measurement (such as the value of currency at a particular point in time) to be used in interpreting the data stored therein. Note that while data warehouse 640 is depicted in FIG. 6 as being separate from Master Data Store (MDS) 620 and common extract store 610, in other embodiments one or more of Master Data Store (MDS) 620 and common extract store 610 may be implemented using the same digital data store as data warehouse 640.

Data stored in data warehouse 640 may be cached by business intelligence (BI) tool 680. BI tool 680 is an application that may use data stored in data warehouse 640 for querying, reporting, and analyzing data as well as other business intelligence functions. BI tool 680 may provide information to a user in a variety of different formats, such as reports, dashboards, and the like.

System 600 may be used to generate an external data feed 697 which is delivered by system 600 to company 604. Upon receiving external data feed 697, company 604 may store the data contained in external data feed in a persistent data store, such as data warehouse 690. BI tool 685 is an application that may be used by company 604 for querying, reporting, and analyzing data stored in data warehouse 690. BI tool 685 may provide information to a user in a variety of different formats, such as reports, dashboards, and the like.

Company 604 may be, but need not be, a cloud-based application or service provider. In such a case, company 604 may use the data, delivered by external data feed 697 and subsequently stored in data warehouse 690, to augment their product and service offerings.

The business intelligence tools 685 employed by company 604 may not or need not be as sophisticated as those employed or supported by system 600. As such, additional modules or enhancements, such as analytics cache 695, may be needed on site at company 604 to ensure that optimal analytical processing may be performed. To that end, it may be necessary to pre-compute data for certain reports and dashboards at system 600. The pre-computed data may be aggregated, summarized, or otherwise processed and provided to analytics cache 695 via an external data feed. By storing such data within analytics cache 695, sophisticated reports and analysis may be obtained using BI tools 685 which may otherwise lack sophisticated query generation capabilities to produce such results without the aid of analytics cache 695.

Types of Data Feeds

FIG. 5 is an illustration of the levels of external data feeds 510 which may be provided to a customer 502 by a data feed provider 500 according to an embodiment of the invention. As shown in FIG. 5, external data feeds 510 may be generated at many levels. For example, an illustrative data feed 510 may be extracted from any one or more of the sources depicted in FIG. 5. Moreover, each data feed 510 may be processed and transformed in a variety of different ways and in accordance to the wishes of customer 502 in a metadata driven, code generated fashion. As shown in FIG. 5, data feed provider 500 may augment data feed 510 to include social or unstructured data processed by a software toolkit like Hadoop in an interim batch processing store.

FIG. 5 shows that a data feed 510 may be based on data sourced from raw extract store 520, master data store 530, or data warehouse 540. The data feed 510 may then be provided to customer 502; for example, FIG. 5 depicts illustrative data feeds 510 being delivered to external feeds store 560. External data feeds store 560 may be a FTP file share, a web server, or any other store accessible by customer 502. Customer 502 may be informed when the data feed is available at external data feeds store 560; thereafter customer 502 may use an appropriate mechanism to access the data feed, e.g., by accessing the data feed by download via FTP, retrieving the data feed using a web browser, or programmatically querying the store using a published API or driver. External feeds store 560 may be used as a data source to customer 502 or any number of applications or processes of customer 502. In an embodiment, data feed provider 500 may generate external data feed 510 to provide data that has been extracted from data sources 102, 104, 106 (which store data for customer 502) and has been subsequently transformed into a relational (but Source Dependent) format. This type of external data feed may be used to provide customer 502 with a local copy of the data stored in data sources 102, 104, 106. Data sources 102, 104, 106 may correspond to cloud-based data repositories or cloud-based applications of customer 502, and so the data stored in data sources 102, 104, and 106 may not otherwise be available locally to customer 502. While FIG. 5 depicts three data sources (102, 104, and 106), embodiments of the invention may operate equally well with any number of data sources.

This type of external data feed may advantageously be used to provide customer 502 with a local copy of the data stored in data sources 102, 104, and 106 that is standardized in a relational format. As the format standardization may involve complex processing to flatten hierarchies inherent in XML data sources, this is a significant benefit to certain companies. While this type of external data feed is incremental, this type of external data feed has not undergone Change Data Capture (CDC) processing. As such, this type of external data feed may appeal to companies that wish to perform data warehousing and who already have a Change Data Capture (CDC) infrastructure in house. This type of external data feed may appeal to companies that wish to maintain archiving or enterprise search applications and rely on those applications to either identify incremental changes that have occurred between data feeds or store duplicated data efficiently.

In an embodiment, data feed provider 500 may generate external data feed 510 to provide data extracted from data sources 102, 104, and 106 and subsequently transformed into a relational format that has undergone Change Data Capture (CDC) processing. This type of external data feed may appeal to companies that wish to perform data warehousing and who lack a Change Data Capture (CDC) infrastructure in house. Beneficially, the complex Change Data Capture (CDC) processing has already been performed on data in this external data feed, thereby making the feed easier to plug into either on premise data warehouses lacking a Change Data Capture (CDC) infrastructure or archiving and enterprise search applications that lack sophisticated capabilities to store duplicated data efficiently.

In an embodiment, data feed provider 500 may generate external data feed 510 to provide data that has been extracted from data sources storing social data (which is typically unstructured) or other non-business data (such as census information). The benefit of this type of external data feed is vast amounts of social or non-business data may be processed in conjunction with the business data of a company to yield something meaningful and concise to gain insight into the social and marketing implications of business actions and campaigns.

In an embodiment, data feed provider 500 may generate external data feed 510 to provide data that has been extracted from data sources 102, 104, and 106 and subsequently transformed into dimensional models used by data feed provider 500 (or data tier 120). This type of external data feed would benefit companies who wish to augment their existing data warehouses with data on additional subject areas and who are comfortable with the dimensional model employed by data feed provider 500 (or data tier 120). This type of external data feed may be used to allow certain types of application companies, who offer cloud-based applications to support historical analytics if they would otherwise lack the capability to do so.

In an embodiment, data feed provider 500 may generate external data feed 510 to provide data that has been extracted from data sources 102, 104, and 106 and subsequently transformed into a dimensional model customized by customer 502. This type of external data feed would benefit companies who wish to augment their existing data warehouses with data about additional subject areas or with data from cloud sources and thereafter incorporate such data into their existing data stores but in a dimensional model different than employed by data feed provider 500 (or data tier 120). For example, customer 502 may specify that external data feed 510 supply data in a dimensional model used by customer 502.

In an embodiment, data feed provider 500 may generate external data feed 510 to provide data extracted from data sources 102, 104, and 106 and subsequently transformed into a dimensional model used by a known vendor of Business Intelligence (BI) applications, such as Oracle BI Apps, SAP BW, and the like. This type of external data feed would benefit companies already using one of the known vendor applications and who wish to augment the data warehouse of that application with data from a particular data source in a model understood by that application. Alternately or additionally, this type of data feed may also be used to supply data in a format consumable to a less sophisticated application (such as a business intelligence application) used by customer 502; for example, data feed 501 may provide data in an aggregated dimensional format that is more easily and directly consumable by simplistic business intelligence (BI) tools used by customer 502.

In an embodiment, data feed provider 500 may generate external data feed 510 to provide data extracted from data warehouse 540 (but which originated from data sources 102, 104, and 106) that has been pre-aggregated to serve reports and dashboards efficiently or to meet the needs of data discovery tools without sophisticated analytical capabilities of their own.

In the above descriptions of different types of external data feeds, the accompanying metadata describing the data is also part of the external data feed. The metadata provides value-add for the source level feeds in terms of description of the source data and for the warehouse level feeds in terms of the dimensional model and a declarative ETL plan outlining the transformations that took the source data to star schemas in the dimensional model.

Having described several non-limiting examples of the various types of external data feeds which may be generated and delivered, additional details on how an external data feed is generated and delivered is presented below.

Operation of Data Feed Application

Figure 7:
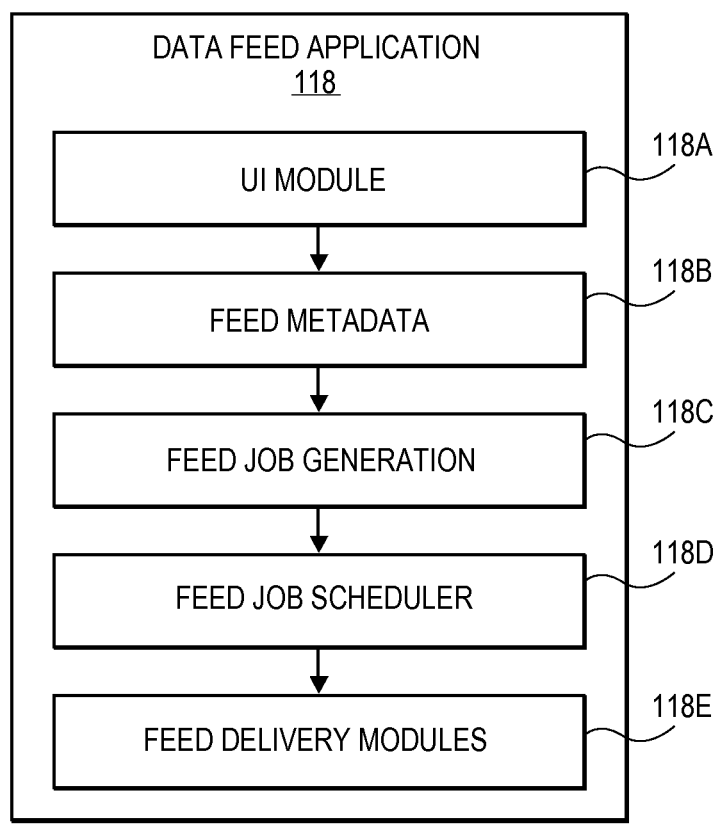
FIG. 7 is a block diagram of the functional components of data feed application according to an embodiment of the invention.

Company 604 may use an interface provided by system 600 to configure the contents and delivery of an external data feed, such as external data feed 697. Similarly, customer 502 may configure the contents and delivery of an external data feed. In an embodiment, such an interface may be provided by data feed application 118. FIG. 7 is a block diagram of the functional components of data feed application 118 according to an embodiment of the invention. As shown in FIG. 7, in an embodiment, data feed application 118 comprises UI module 118A, feed metadata 118B, feed job generation module 118C, feed job scheduler 118D, and feed delivery modules 118E. Each of these components will be discussed separately below.

UI module 118A is responsible for generating a user interface through which company 604, or a user associated therewith, or customer 502 can configure and specify the desired characteristics of external data feed 697 or 510. Using UI module 118A, a user may track the progress of generating external data feed 697 or 510. The user interface provided by UI module 118A may provide a user interface that visually depicts external data feed 697 or 510 and allows the user to configure the contents thereof, e.g., the user interface may allow a user to select which data is included in the external data feed (such as by selecting a column of a table of a data source) and specify filters and conditions for filtering out data not to be included in external data feed 697 or 510.

Feed metadata 118B corresponds to metadata that is created by UI module 118A. Feed metadata 118B defines all the characteristics and attributes of an external data feed, such as what data is included in the external data feed, to whom the external data feed should be delivered, and when or how often the external data feed should be delivered. In an embodiment, feed metadata 118B may be stored in metadata repository 180.

Feed job generation module 118C is a software module which reads feed metadata 118B and generates executable jobs which will create external data feeds as specified by feed metadata 118B.

Feed job scheduler 118D is a software module that is responsible for scheduling, either on a recurring basis or on-demand, the creation and delivery of external data feed 697.

Feed delivery modules 118E is responsible for delivering an external data feed. In an embodiment, an external data feed can be delivered by direct delivery into an application consuming the external data feed via an API supported by the application. Additionally, embodiments may support a pull model, rather than a push model, whereby an external data feed is delivered upon a received request, e.g., such a request may be issued by a hosted FTP server or by a web browser.

Given that metadata repository 180 is versioned and that data repositories are historical (allowing for the query of the data image at any point in time), the generation of external data feed is efficiently repeatable. If, for any reason a particular external data feed did not reach the intended audience or was corrupted in some manner, the external data feed can be regenerated without requiring that particular external data feed to be separately persisted. Consequently, once an external data feed has been downloaded (perhaps from a FTP site or from a web server), there is no need to persist the external data feed as it may always be recreated upon need. Indeed, if an external data feed is streamed directly to an application using the application's API, then there is no need for the external data feed to be persisted in its entirety at all.

Hardware Mechanisms

Figure 8:
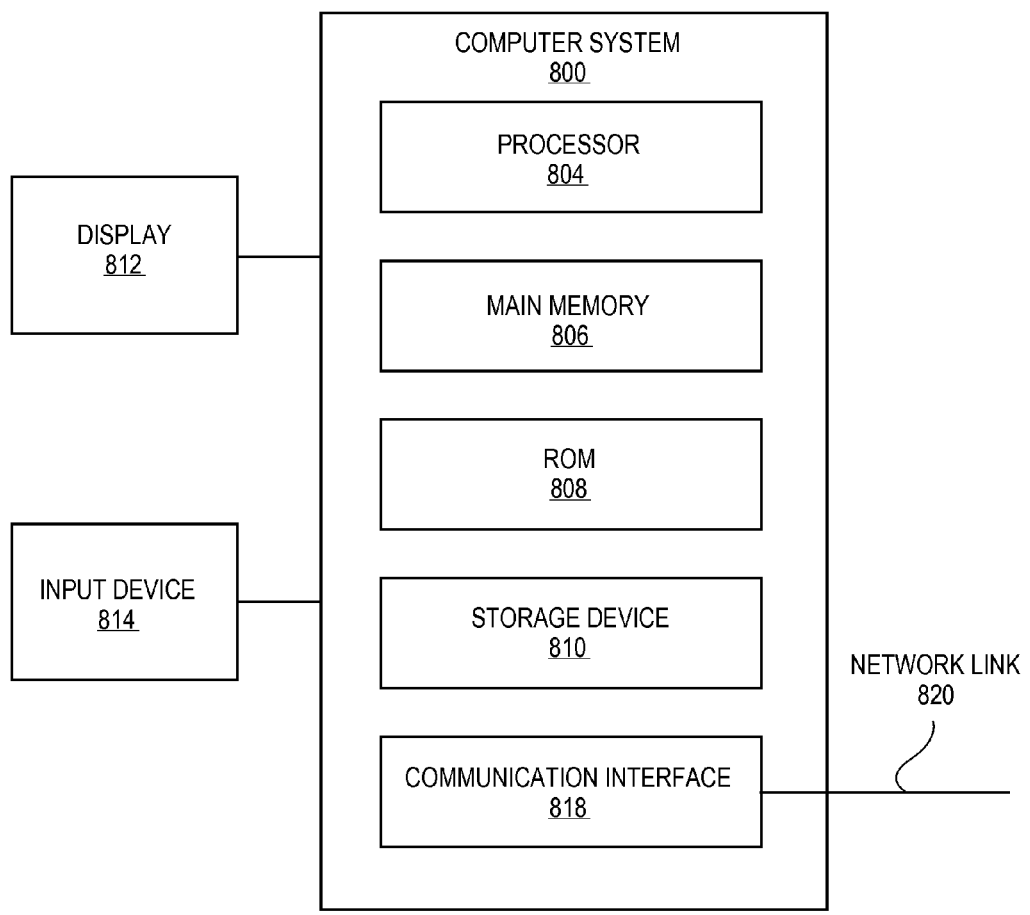
FIG. 8 is a block diagram that illustrates a computer system upon which an embodiment of the invention may be implemented.

In an embodiment, each of the software components depicted in any of the figures may be implemented on one or more computer systems. FIG. 8 is a block diagram that illustrates a computer system 800 upon which an embodiment of the invention may be implemented. In an embodiment, computer system 800 includes processor 804, main memory 806, ROM 808, storage device 810, and communication interface 818. Computer system 800 includes at least one processor 804 for processing information. Computer system 800 also includes a main memory 806, such as a random access memory (RAM) or other dynamic storage device, for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device for storing static information and instructions for processor 804. A storage device 810, such as a magnetic disk or optical disk, is provided for storing information and instructions.

Computer system 800 may be coupled to a display 812, such as a cathode ray tube (CRT), a LCD monitor, and a television set, for displaying information to a user. An input device 814, including alphanumeric and other keys, is coupled to computer system 800 for communicating information and command selections to processor 804. Other non-limiting, illustrative examples of input device 814 include a mouse, a trackball, or cursor direction keys for communicating direction information and command selections to processor 804 and for controlling cursor movement on display 812. While only one input device 814 is depicted in FIG. 8, embodiments of the invention may include any number of input devices 814 coupled to computer system 800.

Embodiments of the invention are related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 804 for execution. Such a medium may take many forms, including but not limited to, non-volatile media and volatile media. Non-volatile media includes, for example, optical or magnetic disks, such as storage device 810. Volatile media includes dynamic memory, such as main memory 806.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 804 for execution. For example, the instructions may initially be carried on a magnetic disk of a remote computer. The remote computer can load the instructions into its dynamic memory and send the instructions over a network link 820 to computer system 800.

Communication interface 818 provides a two-way data communication coupling to a network link 820 that is connected to a local network. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through a local network to a host computer or to data equipment operated by an Internet Service Provider (ISP).

Computer system 800 can send messages and receive data, including program code, through the network(s), network link 820 and communication interface 818. For example, a server might transmit a requested code for an application program through the Internet, a local ISP, a local network, subsequently to communication interface 818. The received code may be executed by processor 804 as it is received, and/or stored in storage device 810, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

What is claimed is:

1. A non-transitory computer-readable storage medium storing one or more sequences of instructions for generating and providing a customizable external data feed in at least one of a relational format or a dimensional model format to a recipient by generating a backward delta data, which when executed by one or more processors, cause:
   storing metadata that identifies a plurality of configuration parameters that define characteristics of said external data feed;
   programmatically generating, using an application configurator, a plurality of executable jobs based on the plurality of configuration parameters defined in said metadata;
   executing at least a first portion of said plurality of executable jobs to extract data identified by said plurality of configuration parameters from one or more data sources to store said data in a raw extract store;
   executing at least a second portion of said plurality of executable jobs to transform the data stored in said raw extract store into a relational format with support for historical storage, wherein said data in said relational format is stored in at least one of a source independent format or a source dependent format in a master data store;
   determining, by implementing a Change Data Capture (CDC) process, which data stored in said master data store is added, deleted or modified from previous data that is extracted from said one or more data sources by annotating incremental data;
   generating a backward delta data by inverting said incremental data, wherein said backward delta data identifies what additions, deletions, and modifications need to be made to said data stored in said master data store to cause a current version of said master data store to return to a most recent version of said master data store, wherein said generating comprises updating said metadata in response to a change detected in a schema of said one or more data sources;
   upon receiving an instruction to configure said external data feed to supply data from a prior state of said master data store, generating, using said metadata and said backward delta data, said external data feed to supply data from a prior state of said master data store;
   executing at least a third portion of said plurality of executable jobs that use Extract, Transform, Load (ETL) transforms to convert said data stored in said master data store into at least one of (i) a relational format post said Change Data Capture (CDC) processing or (ii) a dimensional model format selected from at least one of (a) a dimensional model format stored in a data warehouse, (b) a dimensional model format customized by said recipient, (c) a dimensional model format specific to or consumable by a business intelligent (BI) application used by said recipient or (d) a dimensional model format with pre-aggregated data to facilitate reporting and data analysis; and
   providing said external data feed in at least one of said relational format or said dimensional model format to said recipient, wherein said external data feed comprises data generated by said first, second or third portion of executable jobs.

2. The non-transitory computer-readable storage medium of claim 1, wherein the external data feed is received by an application operated by a different party than an operator of the data warehouse, and wherein the application is only capable of processing data stored locally to the application.

3. The non-transitory computer-readable storage medium of claim 1, wherein the external data feed is received by an application operated by a different party than an operator of the data warehouse, and wherein the external data feed supplies the application with data not previously available to the application.

4. The non-transitory computer-readable storage medium of claim 1, wherein the external data feed is received by a different party than an operator of the data warehouse, and wherein the different party stores the contents of the external data feed as a backup copy of the one or more data sources.

5. The non-transitory computer-readable storage medium of claim 1, further comprising communicating said external data feed to a cloud-based application, wherein said external data feeds are stored at a persistent storage medium accessible to said cloud-based application to augment the service of said cloud-based application.

6. An apparatus for generating and providing a customizable external data feed in at least one of a relational format or a dimensional model format to a recipient by generating a backward delta data, comprising:
 one or more processors; and
 one or more non-transitory computer-readable mediums storing one or more sequences of instructions, which when executed by the one or more processors, cause:
 storing metadata that identifies a plurality of configuration parameters that define characteristics of said external data feed;
 programmatically generating, using an application configurator, a plurality of executable jobs based on the plurality of configuration parameters defined in said metadata;
 executing at least a first portion of said plurality of executable jobs to extract data identified by said plurality of configuration parameters from one or more data sources to store said data in a raw extract store;
 executing at least a second portion of said plurality of executable jobs to transform the data stored in said raw extract store into a relational format with support for historical storage, wherein said data in said relational format is stored in at least one of a source independent format or a source dependent format in a master data store;
 determining, by implementing a Change Data Capture (CDC) process, which data stored in said master data store is added, deleted or modified from previous data that is extracted from said one or more data sources by annotating incremental data;
 generating a backward delta data by inverting said incremental data, wherein said backward delta data identifies what additions, deletions, and modifications need to be made to said data stored in said master data store to cause a current version of said master data store to return to a most recent version of said master data store, wherein said generating comprises updating said metadata in response to a change detected in a schema of said one or more data sources;
 upon receiving an instruction to configure said external data feed to supply data from a prior state of said master data store, generating, using said metadata and said backward delta data, said external data feed to supply data from a prior state of said master data store;
 executing at least a third portion of said plurality of executable jobs that use Extract, Transform, Load (ETL) transforms to convert said data stored in said master data store into at least one of (i) a relational format post said Change Data Capture (CDC) processing or (ii) a dimensional model format selected from at least one of (a) a dimensional model format stored in a data warehouse, (b) a dimensional model format customized by said recipient, (c) a dimensional model format specific to or consumable by a business intelligent (BI) application used by said recipient or (d) a dimensional model format with pre-aggregated data to facilitate reporting and data analysis; and
 providing said external data feed in at least one of said relational format or said dimensional model format to said recipient, wherein said external data feed comprises data generated by said first, second or third portion of executable jobs.

7. The apparatus of claim 6, wherein the external data feed is received by an application operated by a different party than an operator of the data warehouse, and wherein the application is only capable of processing data stored locally to the application.

8. The apparatus of claim 6, wherein the external data feed is received by an application operated by a different party than an operator of the data warehouse, and wherein the external data feed supplies the application with data not previously available to the application.

9. The apparatus of claim 6, wherein the external data feed is received by a different party than an operator of the data warehouse, and wherein the different party stores the contents of the external data feed as a backup copy of the one or more data sources.

10. The apparatus of claim 6, wherein said one or more non-transitory computer-readable mediums further causes communicating said external data feed to a cloud-based application, wherein said external data feeds are stored at a persistent storage medium accessible to said cloud-based application to augment the service of said cloud-based application.

11. A method for generating and providing a customizable external data feed in at least one of a relational format or a dimensional model format to a recipient by generating a backward delta data, comprising:
 storing metadata that identifies a plurality of configuration parameters that define characteristics of said external data feed;
 programmatically generating, using an application configurator, a plurality of executable jobs based on the plurality of configuration parameters defined in said metadata;
 executing at least a first portion of said plurality of executable jobs to extract data identified by said plurality of configuration parameters from one or more data sources to store said data in a raw extract store;
 executing at least a second portion of said plurality of executable jobs to transform the data stored in said raw extract store into a relational format with support for historical storage, wherein said data in said relational format is stored in at least one of a source independent format or a source dependent format in a master data store;
 determining, by implementing a Change Data Capture (CDC) process, which data stored in said master data store is added, deleted or modified from previous data that is extracted from said one or more data sources by annotating incremental data;
 generating a backward delta data by inverting said incremental data, wherein said backward delta data identifies what additions, deletions, and modifications need to be made to said data stored in said master data store to cause a current version of said master data store to return to a most recent version of said master data store, wherein said generating comprises updating said metadata in response to a change detected in a schema of said one or more data sources;

upon receiving an instruction to configure said external data feed to supply data from a prior state of said master data store, generating, using said metadata and said backward delta data, said external data feed to supply data from a prior state of said master data store;

executing at least a third portion of said plurality of executable jobs that use Extract, Transform, Load (ETL) transforms to convert said data stored in said master data store into at least one of (i) a relational format post said Change Data Capture (CDC) processing or (ii) a dimensional model format selected from at least one of (a) a dimensional model format stored in a data warehouse, (b) a dimensional model format customized by said recipient, (c) a dimensional model format specific to or consumable by a business intelligent (BI) application used by said recipient or (d) a dimensional model format with pre-aggregated data to facilitate reporting and data analysis; and providing said external data feed in at least one of said relational format or said dimensional model format to said recipient, wherein said external data feed comprises data generated by said first, second or third portion of executable jobs.

12. The method of claim 11, wherein the external data feed is received by an application operated by a different party than an operator of the data warehouse, and wherein the application is only capable of processing data stored locally to the application.

13. The method of claim 11, wherein the external data feed is received by an application operated by a different party than an operator of the data warehouse, and wherein the external data feed supplies the application with data not previously available to the application.

14. The method of claim 11, wherein the external data feed is received by a different party than an operator of the data warehouse, and wherein the different party stores the contents of the external data feed as a backup copy of the one or more data sources.

15. The method of claim 11, further comprising communicating said external data feed to a cloud-based application, wherein said external data feeds are stored at a persistent storage medium accessible to said cloud-based application to augment the service of said cloud-based application.

* * * * *